United States Patent
Bucher et al.

(10) Patent No.: US 12,433,185 B2
(45) Date of Patent: Oct. 7, 2025

(54) DYNAMIC PATH ROUTING USING AERIAL IMAGES

(71) Applicant: Agtonomy, South San Francisco, CA (US)

(72) Inventors: Timothy Bucher, Geyserville, CA (US); Nicholas Fischer, San Francisco, CA (US)

(73) Assignee: AGTONOMY, South San Francisco, CA (US)

( * ) Notice: Subject to any disclaimer, the term of this patent is extended or adjusted under 35 U.S.C. 154(b) by 156 days.

(21) Appl. No.: 18/466,758

(22) Filed: Sep. 13, 2023

(65) Prior Publication Data

US 2024/0090359 A1 Mar. 21, 2024

Related U.S. Application Data (60) Provisional application No. 63/375,460, filed on Sep. 13, 2022.

(51) Int. Cl.

| | |
|---|---|
| A01B 69/00 | (2006.01) |
| A01B 69/04 | (2006.01) |
| G05D 1/00 | (2006.01) |
| G05D 1/02 | (2020.01) |
| G06V 10/74 | (2022.01) |
| G06V 20/10 | (2022.01) |

(52) U.S. Cl.
CPC .......... *A01B 69/008* (2013.01); *G05D 1/0246* (2013.01); *G05D 1/0276* (2013.01); *G06V 10/761* (2022.01); *G06V 20/10* (2022.01)

(58) Field of Classification Search
CPC .. A01B 69/008; A01B 69/001; G05D 1/0246; G05D 1/0276; G05D 1/249; G05D 1/622; G05D 2105/15; G05D 2107/21; G05D 2109/10; G05D 2111/10; G06V 10/761; G06V 20/10; G06V 20/13; G06V 20/17; G06V 20/188; G06V 20/56

See application file for complete search history.

(56) References Cited

U.S. PATENT DOCUMENTS

| | | | | |
|---|---|---|---|---|
| 2015/0106010 | A1* | 4/2015 | Martin | G08G 1/04 701/410 |
| 2019/0087635 | A1* | 3/2019 | Klaus | H04N 13/239 |

* cited by examiner

*Primary Examiner* — Rodney A Butler
(74) *Attorney, Agent, or Firm* — Maschoff Brennan (57) ABSTRACT

A method may include detecting one or more objects within an agricultural environment based on an analysis of a first aerial image of the agricultural environment and determining a first navigational route for an autonomous tractor system to follow to perform an agricultural task within the agricultural environment in view of the detected objects. The autonomous tractor system may be configured to navigate through the agricultural environment via the first navigational route. The method may further include, while autonomous tractor system is navigating through the agricultural environment via the first navigational route, obtaining, from one or more sensors of the autonomous tractor system, data regarding a second object within an agricultural environment. The method may also include determining a second navigational route for the autonomous tractor system to follow to perform the agricultural task within the agricultural environment in view of the first navigational route and the second object.

18 Claims, 4 Drawing Sheets

DYNAMIC PATH ROUTING USING AERIAL IMAGES

FIELD

The present disclosure is generally directed towards path routing using aerial images.

BACKGROUND

Unless otherwise indicated herein, the materials described herein are not prior art to the claims in the present application and are not admitted to be prior art by inclusion in this section.

Farming and agricultural ventures are often associated with labor intensive work and/or time intensive operations. In some circumstances, long hours may be attributed to one or more operations performed over large tracts of land and/or crops dispersed across the land. In some instances, tractors and other large machinery may be used to reduce the amount of time a given operation may take. In circumstances where many operations are performed in a farming or agricultural venture, multiple operators may handle tractors and/or machinery to accomplish the many operations.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an embodiment, a method may include detecting one or more objects within an agricultural environment based on an analysis of a first aerial image of the agricultural environment and determining a first navigational route for an autonomous tractor system to follow to perform an agricultural task within the agricultural environment in view of the detected objects. The autonomous tractor system may be configured to navigate through the agricultural environment via the first navigational route. The method may further include, while autonomous tractor system is navigating through the agricultural environment via the first navigational route, obtaining, from one or more sensors of the autonomous tractor system, data regarding a second object within an agricultural environment. The method may also include determining a second navigational route for the autonomous tractor system to follow to perform the agricultural task within the agricultural environment in view of the first navigational route and the second object.

These and other aspects, features and advantages may become more fully apparent from the following brief description of the drawings, the drawings, the detailed description, and appended claims.

BRIEF DESCRIPTION OF THE DRAWINGS

Example embodiments will be described and explained with additional specificity and detail through the use of the accompanying drawings in which.

DESCRIPTION OF EMBODIMENTS

Agricultural tasks, including land and/or crop management, often are time and/or labor intensive. Agricultural vehicles, such as tractors, may reduce time and/or labor demands associated with the agricultural tasks. Further, in some circumstances, tractors may be configured to be automated or semi-automated, such that the time and/or labor demands may be further reduced. Directing a tractor while not physically present with the tractor may increase efficiency and enable an operator to perform multiple agricultural tasks simultaneously. Options for remote direction of a tractor may include operations such as an autonomous control, path routing by providing one or more waypoints, remote control of a tractor, intervention recovery mechanism that may assist a tractor to resume operations after a fault, and the like.

In some circumstances, autonomous operations of agricultural tasks performed by a tractor may include an array of sensors and/or computing systems associated with the autonomous tractor. The sensors and/or systems associated with an autonomous tractor may enable the autonomous tractor to operate without operator input. However, in some circumstances, the sensors and systems associated with an autonomous tractor may include advanced or particular hardware and/or software, which may cause costs associated with the sensors and systems to increase relative to a non-autonomous tractor. Alternatively, path routing for the tractor may include the operator providing enumerated steps or waypoints which may provide a sequence of locations directed to navigating the tractor through an operational environment associated with the agricultural tasks. In some instances, various obstructions may cause one or more disruptions to the path routing such that intervention from the operator may be needed to continue navigating through the operational environment. Alternatively, remote control of the tractor may remove the operator from the physical location of the tractor and may include reduced costs and/or sensor and system requirements. However, remote control may function with operator overview, such that the operator may be limited in multitasking to perform additional agricultural tasks.

In general, an operational environment associated with agricultural tasks may include one or more permanent and/or semi-permanent objects. Some objects may include natural objects or landmarks. For example, a large tree, a lake, a river, a mountain, and the like. Other objects may include artificial objects or landmarks. For example, a building, a road, a bridge, a canal, and the like. In some circumstances, the operational environment associated with agricultural tasks may include substantially static conditions. For example, the objects may remain relatively unchanged and/or the land and crops within the operational environment may remain substantially static. For example, rotational crops may be located in a substantially fixed location for at least a season and permanent crops, such as fruit trees, vine-based plants, and the like, may remained in a substantially fixed location for multiple seasons.

In some circumstances, one or more conditions associated with the operational environment may change before, during, or after commencement of path routing for a tractor. In these or other embodiments, it may be beneficial to update the path routing based on the changed conditions in the operational environment, without high cost, on-board equipment, and/or direct input from the operator.

Aspects of the present disclosure address these and other shortcomings of prior approaches by obtaining one or more aerial images of an operational environment. The aerial images may be processed to determine objects within the operational environment that may obstruct and/or impair path routing associated with a tractor navigating the operational environment. A route through the operational environment may be determined with respect to the detected objects in the navigational environment. Further, in some embodiments, updates to the aerial images may be obtained. For example, in instances in which an object in the operational environment changes, an object is undetected in the aerial images, a threshold amount of time passes, and/or a threshold amount of distance is traversed by the tractor, updated aerial images may be obtained.

In the present disclosure, the term "tractor" may refer to an agricultural tractor and/or other power equipment or vehicles that may be used in an agricultural setting. Alternatively, or additionally, the term "tractor" may include any power vehicle that may be configured to operate autonomously, which may further be used in the agricultural setting or any other applicable setting. Further, while discussed in primarily an agricultural setting, some embodiments of the present disclosure may be used in other settings, such as mining, construction, and/or other locales where large machinery, such as a tractor, may be beneficial.

Figure 1:
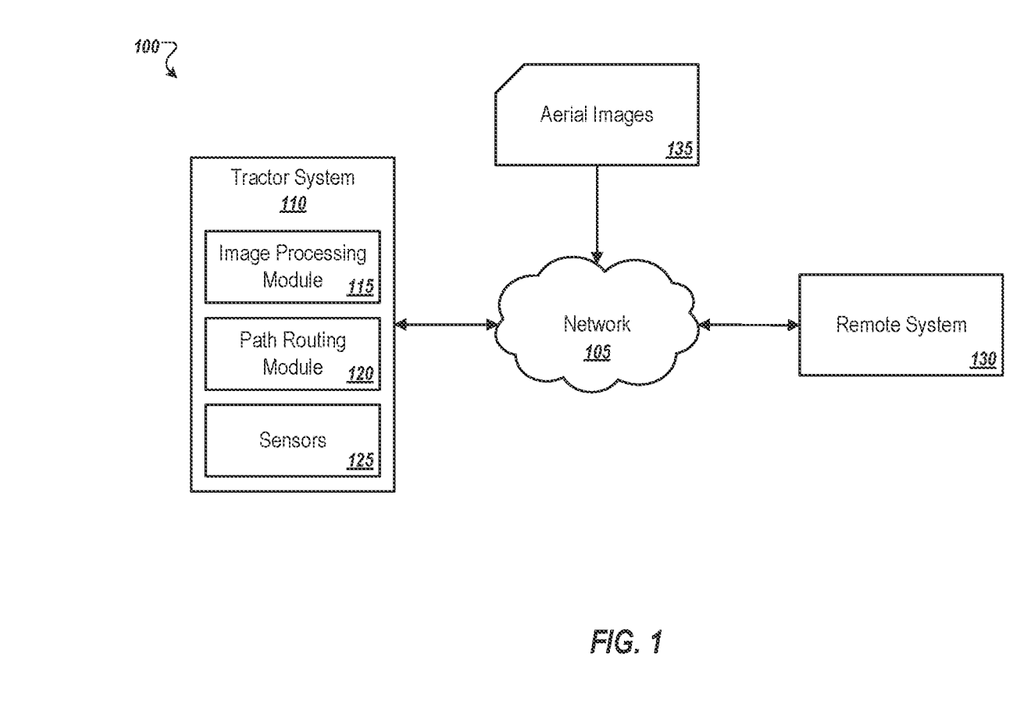
FIG. 1 is a block diagram of an example environment that allow for path routing using aerial images.

FIG. 1 is a block diagram of an example environment that allow for path routing using aerial images, in accordance with at least one embodiment described in the present disclosure. The environment 100 may include a network 105, a tractor system 110, and a remote system 130. The tractor system 110 may include an image processing module 115, a path routing module 120, and sensors 125.

The network 105 may be configured to communicatively couple the tractor system 110 and the remote system 130. In some embodiments, the network 105 may be any network or configuration of networks configured to send and receive communications between systems. In some embodiments, the network 105 may include a wired network, an optical network, and/or a wireless network, and may include numerous different configurations, including multiple different types of networks, network connections, and protocols to communicatively couple systems in the environment 100.

In some embodiments, the tractor system 110 and the remote system 130 may include any electronic or digital computing system. For example, the tractor system 110 and/or the remote system 130 may include a desktop computer, a laptop computer, a smartphone, a mobile phone, a tablet computer, server, a processing system, or any other computing system or set of computing systems that may be used for performing the operations described in this disclosure and for communicating data between the tractor system 110 and the remote system 130. An example of such a computing system is described below with reference to FIG. 3. In some embodiments, the tractor system 110 and/or the remote system 130 may include a data storage or a data buffer (not illustrated) which may be configured to store at least a portion of generated data, instructions, routines, environments, and the like, as further described herein.

In some embodiments, the tractor system 110 may be configured to navigate an operational environment using obtained images and/or sensors. The tractor system 110 may be configured to generate and/or navigate a determined route in the operational environment based on an obtained image, image processing performed on the image, and/or sensor feedback. For example, the tractor system 110 may obtain one or more aerial images 135 of the operational environment. Using the obtained aerial images 135, the image processing module 115 may detect one or more objects within the operation environment. Based on the obtained aerial images 135 and a detection of an object located therein, a route through the operational environment may be determined by the path routing module 120, as described herein. As the tractor system 110 navigates through the operational environment via the route determined by the path routing module 120, the sensors 125 may search for additional objects within the operational environment that may be an obstruction to the tractor system 110 navigating the determined route. In these or other embodiments, the tractor system 110 may be configured to perform one or more tasks within the operational environment as the tractor system 110 navigates the determined route.

In some embodiments, the aerial images 135 may be obtained from one or more aerial vehicles and/or objects. For example, the aerial images 135 may be obtained from one or more of a satellite, a drone, an airplane, a helicopter, a balloon, and/or other airborne vehicles or objects. In some embodiments, the aerial images 135 may be obtained from multiple sources and compared and/or combined to improve a quality of the aerial images 135. For example, a first aerial image may be obtained by a satellite of a first portion of the operational environment having a first image quality and a second aerial image may be obtained by a drone of the first portion of the operational environment having a second image quality and the first aerial image and the second aerial image may be combined into a third aerial image having a third image quality which may be a better quality than the first image quality and/or the second image quality.

In another example, a first aerial image may be obtained by a satellite of a first portion of the operational environment and a second aerial image may be obtained by an airplane of a second portion of the operational environment and the first aerial image may be combined with the second aerial image into a third aerial image that may display a larger portion of the operational environment relative to the first aerial image or the second aerial image.

In some embodiments, the aerial images 135 may include one or more image types. The image types may include a camera image, an infrared image, an ultraviolet image, a radar image, a LIDAR image, range imaging images, and/or other image types that may represent at least a portion of the operational environment. In some embodiments, one or more image types may be overlaid with other image types to generate additional views of the operational environment. For example, an infrared image may be overlaid on a camera image, which may provide a different view and/or data of the operational environment.

In some embodiments, the number of aerial images 135 obtained for a given operational environment may vary based on the size of the operational environment. For example, a relatively large operational environment may include relatively many aerial images 135 while a relatively small operational environment may include relatively few aerial images 135. Alternatively, or additionally, multiple aerial images 135 may be used to improve a quality of the aerial images 135 obtained by the tractor system 110. For example, multiple aerial images 135 may be obtained and compared to one another by the tractor system 110, such that the quality of the images, the resolution of the images, and/or the quality of the objects displayed therein, may be improved. In instances in which the aerial images 135 may be associated with a large operational environment, multiple aerial images 135 may be stitched together to form one image of the operational environment, which stitched image may be obtained by the tractor system 110 (e.g., such as the image processing module 115) for additional processing, as described herein.

In some embodiments, the tractor system 110 (which may include components of the tractor system 110, such as the image processing module 115) may be configured to determine and/or assign an image weight to each of the aerial images 135. The image weight may provide an indication to the operator and/or the tractor system 110 of quality associated with the aerial images 135. In some embodiments, the image weight may be based on at least a resolution associated with the aerial images 135, an amount of operational environment included in the aerial images 135, a time of day of when the aerial images 135 were obtained, a time of year when the aerial images 135 were obtained, weather conditions when the aerial images 135 were obtained, and/or other factors associated with the aerial images 135.

In some embodiments, the image weights associated with the respective aerial images 135 may be static. For example, once an aerial image of the aerial images 135 is obtained, an image weight may be determined and/or assigned to the aerial image. Alternatively, the image weights associated with the respective aerial images 135 may vary. For example, an initial image weight may be determined and/or assigned to an aerial image and the image weight may change in response to one or more factors associated with the aerial image. The factors may include an amount of elapsed time from when the aerial image was obtained, a difference in current time of day relative to the aerial image time of day, a difference in current time of year relative to the aerial image time of year, a difference in current weather conditions relative to the aerial image weather conditions, and so forth.

In some embodiments, the image processing module 115 may obtain an image and may be configured to detect objects within the image. For example, in instances in which the aerial images 135 of an operational environment are obtained, the image processing module 115 may detect one or more objects within the aerial images 135 that may affect the path routing of the tractor system 110 through the operational environment.

In some embodiments, the objects may include any type of obstruction that may affect the path routing of the tractor system 110. For example, the obstruction may cause the path routing of the tractor system 110 to select a different path. For example, the path routing may select a path that avoids, goes arounds, or compensates for the obstruction by taking a different path that does not include the obstruction. The objects may include any permanent, semi-permanent, or variable object within the operational environment which may affect the route of the tractor system 110. Example obstructions may include a building, a rock, equipment, vegetation, mud, water, a tree, crops and/or crop fields, a river, an automobile, a canal, and/or other objects within an operational environment that may be difficult for the tractor system 110 to traverse.

In some embodiments, the objects may be any type of navigational structure that may affect the path routing of the tractor system 110. For example, the navigational structure may cause the path routing of the tractor system 110 to select a different path. For example, the path routing may select a path that incorporates or uses the navigational structure. For example, the navigational structure may be a road, path, or other structure that may allow for the tractor system 110 to more easily traverse the environment and/or traverse the environment at higher speeds, with reduced processing of sensor data for obstacles surrounding the tractor system 110, with a larger load, and/or without other adjustments to the tractor system 110. In some embodiments, the aerial images 135 may include at least a minimum threshold resolution to be used by the image processing module 115. For example, in instances in which a received aerial image includes a resolution below a threshold resolution, the image processing module 115 and/or the path routing module 120 may not generate an output for path routing the tractor system 110 through the operational environment depicted in the received aerial image. An example minimum threshold resolution may be approximately five meters resolution. Other minimum threshold resolutions may be employed by the tractor system 110, which may be associated with the operational environment of the tractor system 110, based on the tasks that may be performed by the tractor system 110, and/or other considerations. In some embodiments, more precise path routing may be accomplished with higher resolution aerial images. For example, aerial images 135 having one meter resolution may enable more precise path routing for the tractor system 110 than aerial images 135 having approximately five-meter resolution.

In these or other embodiments, the image processing module 115 may be configured to produce a processed image that may include the aerial images 135 and one or more indications of detected objects within the aerial images 135. For example, processed images may include the aerial images 135 overlaid with one or more indications associated with the detected objects within the operational environment. Alternatively, or additionally, the image processing module 115 may be configured to generate an object output that may include one or more indications that may be associated with the aerial images 135. In some embodiments, the object output may include a description and/or location of the detected object within the operational environment, which may include a visual indication of the detected objects, a text-based description of the detected objects, geographic coordinates associated with the detected objects, a spreadsheet having a description and location of the detected objects, combinations of any of the described descriptions, and/or other descriptions of the detected objects. The object output may be transmitted to other systems such that another system may combine the aerial images 135 with the object output to obtain the locations of the detected objects within the operational environment depicted by the aerial images 135.

Generally, the image processing module 115 may include code and routines configured to enable a computing system to perform one or more operations. Alternatively, or additionally, the image processing module 115 may be implemented using hardware including a processor, a microprocessor (e.g., to perform or control performance of one or more operations), a field-programmable gate array (FPGA), an application-specific integrated circuit (ASIC), and/or other hardware. In some other instances, the image processing module 115 may be implemented using a combination of hardware and software. In the present disclosure, operations described as being performed by the image processing module 115 may include operations that the image processing module 115 may direct a corresponding system to perform.

In some embodiments, the path routing module 120 may obtain the processed image from the image processing module 115. Alternatively, or additionally, the path routing module 120 may obtain the aerial images 135 and an object output from the image processing module 115 and the path routing module 120 may combine the aerial images 135 and the object output to obtain a processed image. In these or other embodiments, the path routing module 120 may be configured to obtain a route through the operational environment.

In some embodiments, the path routing module 120 may obtain a route through the operational environment via operator input. For example, an operator may view the aerial images 135 and/or the detected objects therein (e.g., such as detected by the image processing module 115), and the operator may provide input to the path routing module 120 which may indicate a route through the operational environment.

Alternatively, or additionally, the path routing module 120 may be configured to determine a route through the operational environment based at least in part on the processed image from the image processing module 115, the aerial images 135, and/or the object output from the image processing module 115. In some embodiments, the path routing module 120 may obtain a start point and/or an end point and be configured to determine a route from the start point to the end point in view of the detected objects. Alternatively, or additionally, the path routing module 120 may obtain one or more midpoints (e.g., in addition to the start point and/or the end point) and may determine a route from the start point to the end point where the route may include navigating to the one or more midpoints. In instances in which the start point and the end point are substantially the same (e.g., such as a fuel station, or a parking spot), the midpoints may provide waypoints for the routing through the operational environment.

In some embodiments, the route may be determined to allow the tractor system 110 to complete an agricultural task within the operational environment, such as an agricultural environment. For example, the route may include route to a location where an agricultural task may begin, a route while performing the agricultural task, and a route back to a central location from where the agricultural task may end. The agricultural task may include any task such as mowing, spraying, tilling, hauling objects, picking, harvesting, among other tasks.

In some embodiments, any of the start point, the end point, and/or the midpoints may be provided to the path routing module 120 via operator input. Alternatively, or additionally, the start point, the end point, and/or the midpoints may be predetermined, such as in conjunction with a task performed by the tractor system 110 in the operational environment. For example, in instances in which a mowing task is selected, one or more midpoints may be included in the route which may be associated with areas within the operational environment to be mowed (e.g., grassy areas).

Generally, the path routing module 120 may include code and routines configured to enable a computing system to perform one or more operations. Alternatively, or additionally, the path routing module 120 may be implemented using hardware including a processor, a microprocessor (e.g., to perform or control performance of one or more operations), a field-programmable gate array (FPGA), an application-specific integrated circuit (ASIC), and/or other hardware. In some other instances, the path routing module 120 may be implemented using a combination of hardware and software. In the present disclosure, operations described as being performed by the path routing module 120 may include operations that the path routing module 120 may direct a corresponding system to perform.

In some embodiments, the sensors 125 may be configured to detect objects and/or obstructions within the operational environment, such as while the tractor system 110 is navigating the route determined by the path routing module 120. The sensors 125 may include any sensor configured to obtain data associated with an object in the operational environment, which may include a location of the object. For example, the sensors 125 may include one or more of camera sensors, radar sensors, LIDAR sensors, ultrasonic sensors, laser sensors, infrared sensors, and/or other sensors that may contribute to detecting objects within the operational environment.

In some embodiments, the sensors 125 may detect an obstruction that may interfere with at least a portion of the route as determined by the path routing module 120, which obstruction may not have been included in the detected objects by the image processing module 115 and/or displayed in the aerial images 135. For example, a vehicle may move into the route of the tractor system 110 and become an obstruction after the route may be determined by the path routing module 120. In another example, an object may blend in (e.g., camouflaged) with the operational environment, such that the image processing module 115 may be unable to detect the camouflaged object.

In some embodiments, the obstruction may cause at least a portion of the route to be impaired. An impaired route may include a route that the tractor system 110 is unable to navigate (e.g., a car parked on the route), a route that may become impassable in time (e.g., a flooding road), a route that may include decreased maneuverability relative to another route (e.g., a muddy or swampy route relative to a dry road), and/or other impaired route conditions.

In some embodiments, the path routing module 120 may be configured to consider route options in addition to and/or beyond obstructions detected by the sensors 125. For example, given a start point, an end point, and one or more midpoints, the path routing module 120 may determine a first route. The first route may include an ingress path, such as a bridge, to a portion of an operational environment, where the ingress path may be damaged but still traversable. The first route may not include any additional egress paths from the portion of the operational environment, which may have become impaired and/or impassable. In such instances, the path routing module 120 may determine a second route that may not include the ingress path based on an analysis of the aerial images 135 and the objects within the operational environment and/or potential hazards that may be encountered in the operational environment.

In instances in which the sensors 125 detect an obstruction in the operational environment that may interfere with the route, the tractor system 110 may request and/or obtain one or more additional aerial images 135. In some embodiments, the tractor system 110 may perform additional object detection using the one or more additional aerial images 135, such as by the image processing module 115, and the tractor system 110 may determine a new route, such as by the path routing module 120.

Alternately or additionally, the tractor system 110 may determine a new route or a deviation in the current route, in view of an object detected by the sensors 125, such as an obstruction or navigational structure, using the data from the sensors 125 and/or the aerial images 135. In these and other embodiments, the tractor system 110 may use the new route or the deviation in the new route to complete an agricultural task associated with the route. In these and other embodiments, the tractor system 110 may also note the location of the object. In these and other embodiments, the tractor system 110 may be further configured to request additional aerial images of the area that includes the object. The tractor system 110 may obtain and/or analyze the additional aerial images after completing the agricultural task. In these and other embodiments, the additional aerial image may be used to determine further routes for the tractor system 110.

Alternately or additionally, in instances in which the sensors 125 detect an obstruction in the operational environment that may interfere with the route that may have not been previously detected in the aerial images 135, the tractor system 110 may reanalyze the aerial images 135. In these and other embodiments, with the additional knowledge from the sensors 125, the tractor system 110 may be able to detect obstructions from the aerial images 135 that may not be detected previously. For example, the tractor system 110 may be configured to reanalyze the aerial images 135 using the information that the detected obstruction exists at a particular location in the aerial images 135 to detect other obstructions in other locations with the same or similar characteristics of the detected obstruction. The path routing module 120 may then adjust the route of the tractor system 110 based on the further detected obstructions.

In some embodiments, sensor data obtained by the sensors 125 may be transmitted to a system associated with obtaining the aerial images 135, such as the aerial vehicle. In some embodiments, the sensor data may be used by the aerial vehicle to improve the aerial images 135. For example, the sensor data may indicate the aerial images 135 may include a low resolution when obtained at a first time of day and the aerial vehicle may obtain future aerial images 135 at a time of day not including the first time of day.

Alternatively, or additionally, the sensor data from the sensors 125 may indicate portions of the operational environment that may have been identified as including an obstruction by the aerial images 135 may not be obstructions. As such, the system acquiring the aerial images 135 may be configured to adjust parameters associated with obtaining the aerial images 135 such that the previously identified obstruction (and/or similar obstructions) may not be considered obstructions in future aerial images 135. For example, an aerial image including a tree may be identified as not usable as a path (e.g., a large tree may include branches above a clearance level of the tractor system 110, which the sensors 125 of the tractor system 110 may determine), such that future aerial images 135 may identify a tree, determine an approximate size of the tree, and further determine that a route under the tree may be an option for path routing of the tractor system 110. In these or other embodiments, a system associated with the obtaining the aerial images 135 may be configured to adjust one or more aspects associated with the obtaining the aerial images 135 in view of the sensor data received from the sensors 125 of the tractor system 110.

In some embodiments, the tractor system 110 may be configured to periodically request updated aerial images 135. For example, the tractor system 110 may request additional aerial images 135 after a threshold amount of time has elapsed or a threshold amount of distance has been covered by the tractor system 110. The tractor system 110 may be configured to perform additional object detection, such as by the image processing module 115, and the tractor system 110 may determine a new route, such as by the path routing module 120 using the periodically obtained aerial images 135.

In some embodiments, the remote system 130 may be configured to at least acquire, process, and/or transmit data in furtherance of, or in complement to operations performed by the tractor system 110. In some embodiments, the remote system 130 may be configured to obtain the aerial images 135 from an aerial vehicle as described herein, and/or another device. In such instances, the tractor system 110 may obtain the aerial images 135 from the remote system 130.

In some embodiments, the remote system 130 may receive operator input that may be obtained by the tractor system 110, as described herein. For example, operator input obtained by the remote system 130 may contribute to the path routing of the tractor system 110 through the operational environment. In another example, operator input obtained by the remote system 130 may provide one or more of a start point, an end point, and/or one or more midpoints that may be used in conjunction with the path routing of the tractor system 110.

In some embodiments, the remote system 130 may be configured to perform some or all of the operations of the tractor system 110 independently of the tractor system 110 and/or in conjunction with the tractor system 110. For example, the remote system 130 may obtain the aerial images 135 and may be configured to perform an image processing function on the obtained aerial images 135 to generate one or more processed images. Alternatively, or additionally, the remote system 130 may obtain one or more processed images and may be configured to perform a path routing function relative to the processed images such that a route for the tractor system 110 may be determined through the operational environment.

In some embodiments, the remote system 130 may be configured to perform an analysis on data generated by the tractor system 110, such as data from the sensors 125. In general, the tractor system 110 may be configured to transmit data to the remote system 130 for analysis and/or processing and the tractor system 110 may obtain results from the remote system 130 after the analysis and/or processing. For example, in some embodiments, the remote system 130 may be configured to determine the route and provide the route to the tractor system 110. Alternately or additionally, the tractor system may obtain an analysis of the aerial images from the remote system 130. In these and other embodiments, the tractor system 110 may determine a route based on analysis of the aerial images from the remote system 130. In these and other embodiments, the tractor system 110 may determine the route and adjust the route based on data from the sensors 125. In these and other embodiments, the tractor system 110 may provide the data from the sensors 125 and indicate that another aerial image may be needed. The remote system 130 may obtain the additional aerial image and analysis the additional aerial image in view of the data from the sensors 125 and provide the analysis to the tractor system 110 for when the tractor system 110 determines another route in the future.

Modifications, additions, or omissions may be made to the environment 100 without departing from the scope of the present disclosure. For example, the environment 100 may include any number of other components that may not be explicitly illustrated or described.

Figure 2:
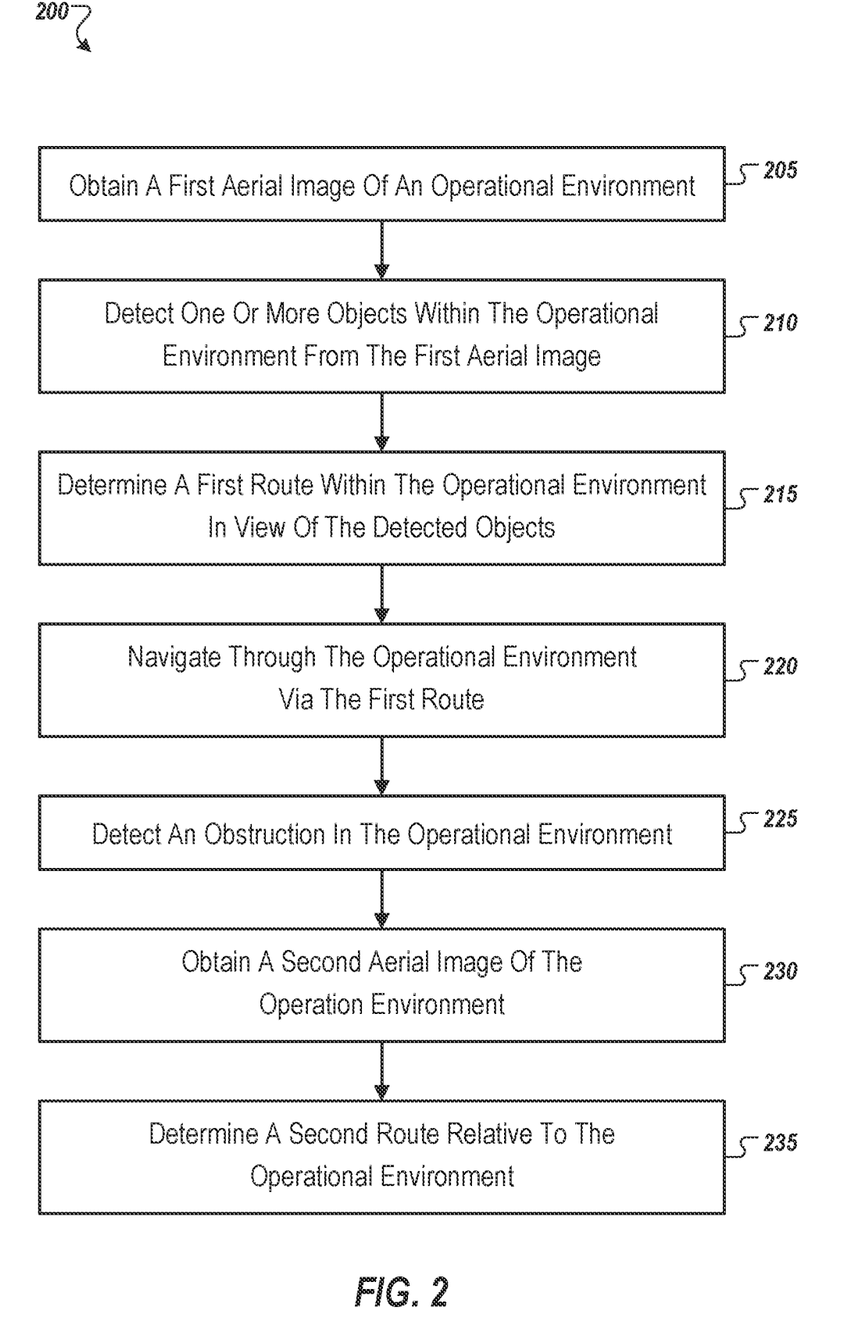
FIG. 2 illustrates a flowchart of an example method of path routing using aerial images.

FIG. 2 illustrates a flowchart of an example method 200 of dynamic path routing using aerial images, according to one or more embodiments of the present disclosure. Each block of method 200, described herein, comprises a computing process that may be performed using any combination of hardware, firmware, and/or software. For instance, various functions may be carried out by a processor executing instructions stored in memory. The method 200 may also be embodied as computer-usable instructions stored on computer storage media. The method 200 may be provided by a standalone application, a service or hosted service (standalone or in combination with another hosted service), or a plug-in to another product, to name a few. In addition, the method 200 is described, by way of example, with respect to the environment of FIG. 1. However, these methods may additionally or alternatively be executed by any one system, or any combination of systems, including, but not limited to, those described herein. In these or other embodiments, one or more operations of the method 200 may be performed by one or more computing devices, such as that described in further detail below with respect to FIG. 3.

The method 200 may begin at block 205 where a first aerial image of an operational environment may be obtained. In some embodiments, the first aerial image may be obtained from a remote system. Alternatively, or additionally, the first aerial image may be obtained from an aerial vehicle.

At block 210, one or more objects within the operational environment may be detected from the first aerial image. In some embodiments, the one or more objects may be obstructions for a potential route through the operational environment.

At block 215, a first route within the operational environment may be determined. In some embodiments, the first route may be determined in view of the detected objects.

At block 220, the operational environment may be navigated via the first route.

At block 225, an obstruction may be detected in the operational environment. In some embodiments, the obstruction may cause at least of a portion of the first route to be impaired. In some embodiments, the obstruction may not be included in the first aerial image.

At block 230, a second aerial image of the operational environment may be obtained. In some embodiments, the second aerial image may include the same or similar operational environment as the first aerial image. The second aerial image may be obtained in response to the detection of the obstruction in the operational environment.

At block 235, a second route within the operational environment may be determined. In some embodiments, the second route may be determined in view of the one or more detected objects and/or the obstruction. In some embodiments, the second route may be determined using the second aerial image.

Modifications, additions, or omissions may be made to the method 200 without departing from the scope of the present disclosure. For example, although illustrated as discrete blocks, various blocks of the method 200 may be divided into additional blocks, combined into fewer blocks, or eliminated, depending on the desired implementation.

Figure 3:
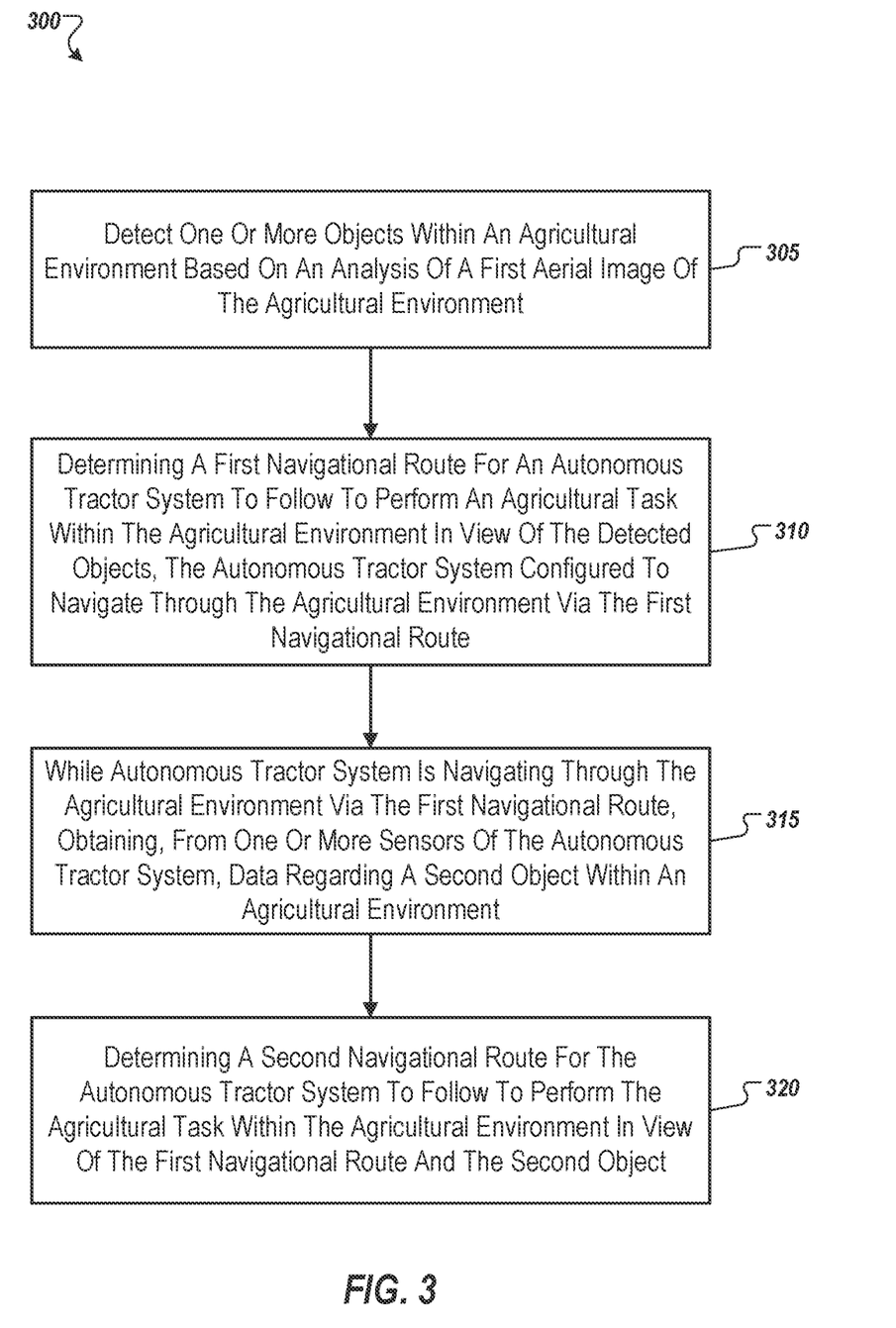
FIG. 3 illustrates another flowchart of an example method of path routing using aerial images.

FIG. 3 illustrates a flowchart of an example method 300 of dynamic path routing using aerial images, according to one or more embodiments of the present disclosure. Each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, the method 300 is described, by way of example, with respect to the environment of FIG. 1. However, these methods may additionally or alternatively be executed by any one system, or any combination of systems, including, but not limited to, those described herein. In these or other embodiments, one or more operations of the method 300 may be performed by one or more computing devices, such as that described in further detail below with respect to FIG. 3.

The method 300 may begin at block 305 where one or more objects may be detected within an agricultural environment based on an analysis of a first aerial image of the agricultural environment. In some embodiments, the one or more objects are detected further based on an analysis of at least one second aerial image of the agricultural environment. In these and other embodiments, an amount that each of the at least one second aerial image and the first aerial image may contribute to detection of the one or more objects is based on weighting scores applied to the at least one second aerial image and the first aerial image. Alternately or additionally, the weighting scores applied to the at least one second aerial image and the first aerial image may be dynamic.

At block 310, a first navigational route may be determined for an autonomous tractor system to follow to perform an agricultural task within the agricultural environment in view of the detected objects. In these and other embodiments, the autonomous tractor system may be configured to navigate through the agricultural environment via the first navigational route.

At block 315, while autonomous tractor system is navigating through the agricultural environment via the first navigational route, data may be obtained from one or more sensors of the autonomous tractor system regarding a second object within an agricultural environment. In some embodiments, the second object may be an obstruction that impairs the ability of the autonomous tractor system to navigate through the agricultural environment via the first navigational route. Alternately or additionally, the second object may be a navigational structure that enhances the ability of the autonomous tractor system to navigate through the agricultural environment.

At block 320, a second navigational route may be determined for the autonomous tractor system to follow to perform the agricultural task within the agricultural environment in view of the first navigational route and the second object.

Modifications, additions, or omissions may be made to the method 300 without departing from the scope of the present disclosure. For example, although illustrated as discrete blocks, various blocks of the method 300 may be divided into additional blocks, combined into fewer blocks, or eliminated, depending on the desired implementation.

For example, the method 300 may further include in response to obtaining data regarding the second object, obtaining a second aerial image of the agricultural environment. In some embodiments, the second navigational route may be determined using the second aerial image. detecting the second object within the agricultural environment from the second aerial image in view of the data from one or more sensors of the autonomous tractor, wherein the second navigational route for the autonomous tractor system is determined in view of the detected objects and the second object.

Alternately or additionally, the method 300 may further include detecting the second object within the agricultural environment from the second aerial image in view of the data from one or more sensors of the autonomous tractor, wherein the second navigational route for the autonomous tractor system is determined in view of the detected objects and the second object.

In some embodiments, the one or more objects may be detected using an image analysis algorithm. In these and other embodiments, the method 300 may further include in response to obtaining data regarding the second object, adjusting the image analysis algorithm to detect objects with characteristics similar to the second object.

Figure 4:
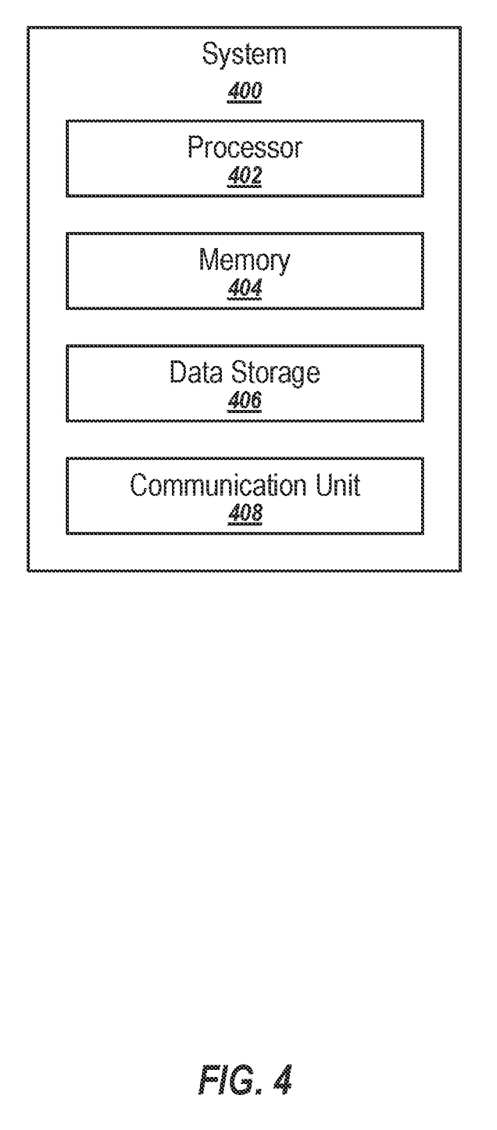
FIG. 4 illustrates a block diagram of an example computing system, all arranged in accordance with at least one embodiment of the present disclosure.

FIG. 4 illustrates an example computing system 400 that may be used for dynamic path routing using aerial images, in accordance with at least one embodiment of the present disclosure. The computing system 400 may be configured to implement or direct one or more operations associated with dynamic path routing using aerial images, which may include operation of the tractor system 110 and/or the remote system 130 and/or the associated operations thereof. The computing system 400 may include a processor 402, memory 404, data storage 406, and a communication unit 408, which all may be communicatively coupled. In some embodiments, the computing system 400 may be part of any of the systems or devices described in this disclosure.

For example, the computing system 400 may be configured to perform one or more of the tasks described above with respect to the tractor system 110, the remote system 130, the method 200, and/or the method 300.

The processor 402 may include any computing entity, or processing device including various computer hardware or software modules and may be configured to execute instructions stored on any applicable computer-readable storage media. For example, the processor 402 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 402 may include any number of processors distributed across any number of networks or physical locations that are configured to perform individually or collectively any number of operations described herein.

In some embodiments, the processor 402 may be configured to interpret and/or execute program instructions and/or process data stored in the memory 404, the data storage 406, or the memory 404 and the data storage 406. In some embodiments, the processor 402 may fetch program instructions from the data storage 406 and load the program instructions in the memory 404. After the program instructions are loaded into memory 404, the processor 402 may execute the program instructions.

For example, in some embodiments, the processor 402 may be configured to interpret and/or execute program instructions and/or process data stored in the memory 404, the data storage 406, or the memory 404 and the data storage 406. The program instruction and/or data may be related to dynamic path routing using aerial images such that the computing system 400 may perform or direct the performance of the operations associated therewith as directed by the instructions. In these and other embodiments, the instructions may be used to perform the method 200 of FIG. 2 or the method of FIG. 3.

The memory 404 and the data storage 406 may include computer-readable storage media or one or more computer-readable storage mediums for carrying or having computer-executable instructions or data structures stored thereon. Such computer-readable storage media may be any available media that may be accessed by a computer, such as the processor 402.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a computer. Combinations of the above may also be included within the scope of computer-readable storage media.

Computer-executable instructions may include, for example, instructions and data configured to cause the processor 402 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.4d 1446 (Fed. Cir. 2007). Combinations of the above may also be included within the scope of computer-readable media.

The communication unit 408 may include any component, device, system, or combination thereof that is configured to transmit or receive information over a network. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna implementing 4G (LTE), 4.5G (LTE-A), and/or 5G (mmWave) telecommunications), and/or chipset (such as a Bluetooth device (e.g., Bluetooth 5 (Bluetooth Low Energy)), an 802.6 device (e.g., Metropolitan Area Network (MAN)), a Wi-Fi device (e.g., IEEE 802.11 ax, a WiMAX device, cellular communication facilities, etc.), and/or the like. The communication unit 408 may permit data to be exchanged with a network and/or any other devices or systems described in the present disclosure.

Modifications, additions, or omissions may be made to the computing system 400 without departing from the scope of the present disclosure. For example, in some embodiments, the computing system 400 may include any number of other components that may not be explicitly illustrated or described. Further, depending on certain implementations, the computing system 400 may not include one or more of the components illustrated and described.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    detecting, using an image analysis algorithm, one or more objects within an agricultural environment based on an analysis of a first aerial image of the agricultural environment;
    determining a first navigational route for an autonomous tractor system to follow to perform an agricultural task within the agricultural environment in view of the detected objects, the autonomous tractor system configured to navigate through the agricultural environment via the first navigational route;
    navigating, by the autonomous tractor system, through the agricultural environment via the first navigational route;
    while autonomous tractor system is navigating through the agricultural environment via the first navigational route, obtaining, from one or more sensors of the autonomous tractor system, data regarding a second object within an agricultural environment;
    in response to obtaining the data regarding the second object, adjusting the image analysis algorithm to detect objects with characteristics similar to the second object;
    reanalyze the first aerial image using the adjusted image analysis algorithm;
    determining a second navigational route for the autonomous tractor system to follow to perform the agricultural task within the agricultural environment in view of the second object and the reanalyzed first aerial image; and
    navigating, by the autonomous tractor system, the second navigational route.

2. The method of claim 1, further comprising in response to obtaining data regarding the second object, obtaining a second aerial image of the agricultural environment.

3. The method of claim 2, wherein the second navigational route is determined using the second aerial image.

4. The method of claim 2, further comprising:
    detecting the second object within the agricultural environment from the second aerial image in view of the data from the one or more sensors of the autonomous tractor, wherein the second navigational route for the autonomous tractor system is determined in view of the detected objects and the second object.

5. The method of claim 1, wherein the one or more objects are detected further based on an analysis of at least one second aerial image of the agricultural environment, wherein an amount that each of the at least one second aerial image and the first aerial image contribute to detection of the one or more objects is based on weighting scores applied to the at least one second aerial image and the first aerial image.

6. The method of claim 5, wherein the weighting scores applied to the at least one second aerial image and the first aerial image are dynamic.

7. The method of claim 1, wherein the data of the second object results in the second object being interpreted as an obstruction that impairs the ability of the autonomous tractor system to navigate through the agricultural environment via the first navigational route.

8. The method of claim 1, wherein the data of the second object results in the second object being used as a navigational structure that enhances the ability of the autonomous tractor system to navigate through the agricultural environment.

9. One or more computer readable media configured to store instructions, which when executed, are configured to cause performance of the method of claim 1.

10. An autonomous tractor system, comprising:
one or more computer readable media configured to store instructions; and
one or more processors coupled to the computer readable media, the processor configured to execute the instructions to cause or direct the system to perform operations, the operations comprising:
detecting, using an image analysis algorithm, one or more objects within an agricultural environment based on an analysis of a first aerial image of the agricultural environment;
determining a first navigational route for the autonomous tractor system to follow to perform an agricultural task within the agricultural environment in view of the detected objects;
navigating the autonomous tractor system through the agricultural environment via the first navigational route;
while the autonomous tractor system is navigating through the agricultural environment via the first navigational route, obtaining, from one or more sensors of the autonomous tractor system, data regarding a second object within an agricultural environment;
in response to obtaining the data regarding the second object, adjusting the image analysis algorithm to detect objects with characteristics similar to the second object;
reanalyze the first aerial image using the adjusted image analysis algorithm;
determining a second navigational route for the autonomous tractor system to follow to perform the agricultural task within the agricultural environment in view of the second object and the reanalyzed first aerial image; and
navigating through the agricultural environment via the second navigational route.

11. The system of claim 10, wherein the operations further comprise in response to obtaining data regarding the second object, obtaining a second aerial image of the agricultural environment.

12. The system of claim 11, wherein the second navigational route is determined using the second aerial image.

13. The system of claim 11, wherein the operations further comprise:
detecting the second object within the agricultural environment from the second aerial image in view of the data from the one or more sensors of the autonomous tractor, wherein the second navigational route for the autonomous tractor system is determined in view of the detected objects and the second object.

14. The system of claim 10, wherein the one or more objects are detected further based on an analysis of at least one second aerial image of the agricultural environment, wherein an amount that each of the at least one second aerial image and the first aerial image contribute to detection of the one or more objects is based on weighting scores applied to the at least one second aerial image and the first aerial image.

15. The system of claim 14, wherein the weighting scores applied to the at least one second aerial image and the first aerial image are dynamic.

16. The system of claim 10, wherein the data of the second object results in the second object being interpreted as an obstruction that impairs the ability of the autonomous tractor system to navigate through the agricultural environment via the first navigational route.

17. The system of claim 10, wherein the data of the second object results in the second object being used as a navigational structure that enhances the ability of the autonomous tractor system to navigate through the agricultural environment.

18. The system of claim 10, further comprising the autonomous tractor system, wherein the autonomous tractor system includes at least one of the one or more computer readable media and at least one of the one or more processors.

* * * * *